Figure 1:
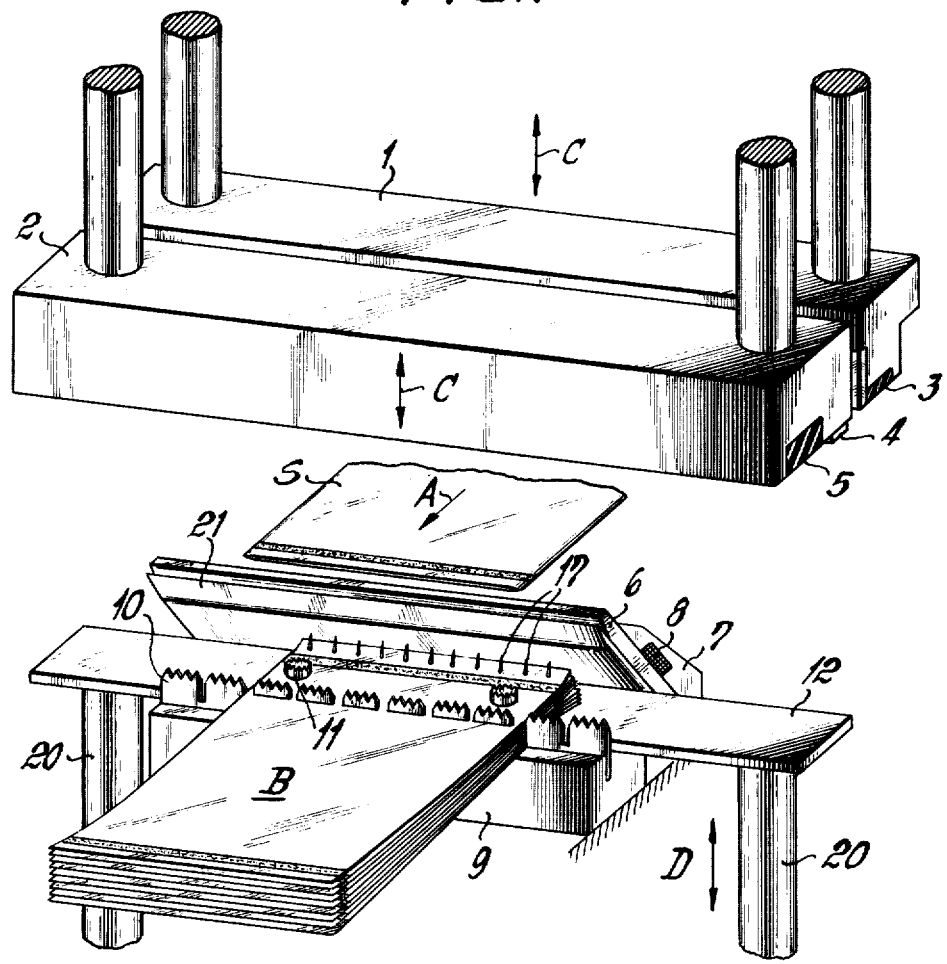

United States Patent
Bosse et al.

[11] 3,893,382
[45] July 8, 1975

[54] PROCESS AND APPARATUS FOR MANUFACTURING PADS OF BAGS MADE OF SYNTHETIC THERMOPLASTICS

[75] Inventors: Frank Bosse, Ibbenburen-Dorenthe; Konrad Tetenborg; Friedhelm Mundus, both of Lengerich, all of Germany

[73] Assignee: Windmoller & Holscher, Lengerich, Germany

[22] Filed: Nov. 7, 1973

[21] Appl. No.: 413,457

[30] Foreign Application Priority Data
Nov. 7, 1972 Germany............................ 2254448

[52] U.S. Cl.............. 93/93 HT; 93/33 H; 93/35 R
[51] Int. Cl.......................... B31b 1/64; B31b 1/98
[58] Field of Search ... 93/33 H, 93 HT, 93 R, 33 R, 93/35 R, 8 R, DIG. 1

[56] References Cited
UNITED STATES PATENTS

| | | | |
|---|---|---|---|
| 2,790,591 | 4/1957 | Rosen | 93/93 HT UX |
| 3,329,260 | 7/1967 | Medleycott | 93/93 HT UX |
| 3,431,828 | 3/1969 | Crawford et al. | 93/93 HT X |
| 3,587,410 | 6/1971 | Dechanciaux | 93/33 H |
| 3,791,267 | 2/1974 | Brooks | 93/33 H X |
| 3,810,420 | 5/1974 | Ravel | 93/93 HT |

*Primary Examiner*—Granville Y. Custer, Jr.
*Assistant Examiner*—James F. Coan
*Attorney, Agent, or Firm*—Fleit & Jacobson

[57] ABSTRACT

In the pads to be made, the bags are joined by welding adjacent to strips which are left at the top edge of the pad when the individual bags have been torn off along respective perforation lines. These strips are provided with holes for suspending the pad. A plastics material tubing is advanced in steps corresponding to the length of the pad toward a welding and severing station, in which a bottom seam is formed, and the leading tubing section is severed in the bottom seam weld or behind the bottom seam weld, in the direction of travel of the tubing. The bag which has been severed from the tubing is stacked and is perforated at its end to be formed with an opening. That strip of the tubing which is disposed between the perforation line and the severed edge is tack-welded to the underlying strip. These operations are repeated to form a pad which consists of bags in the desired number or which has the desired height. The resulting pad is then carried away.

8 Claims, 3 Drawing Figures

PROCESS AND APPARATUS FOR MANUFACTURING PADS OF BAGS MADE OF SYNTHETIC THERMOPLASTICS

This invention relates to a process of manufacturing pads of bags made of synthetic thermoplastics, in which pads the bags are joined by welding at strips which are left at the top edge of the pad when the individual bags have been torn off along respective perforation lines and which are provided with holes for suspending the pad, and apparatus for carrying out the process.

It is known to stack bags so that their edges are aligned and to move said bags so that their rear opening-defining edge-portions, which protrude beyond the forward opening-defining edge-portions, contact parallel hot wires, or to pierce the protruding edge portions with hot pins so that these protruding edge portions are welded together adjacent to the hot tools (U.S. Pat. No. 3,021,947). When individual bags are torn from said known pad of bags, irregular tear-out notches are formed adjacent to the welded joints at the top edge of the rear ply of the bag and impart an unpleasant appearance to the torn-off bag and to the remaining bag portions joined by welding. Besides, the manufacture of the pads requires the formation of stacks of bags which have aligned edges and which are welded together to form pads of bags in subsequent steps so that the manufacturing process is expensive.

To make pads of bags of the kind described first hereinbefore (British Pat. Specification No. 1,073,913), bags are provided which are open at one end and provided with a perforation line which defines the bag opening to be formed, and these bags in the desired number are stacked with aligned edges and the stack is then provided with a continuous transverse welded joint in that end portion which will be left back when the bag has been torn off.

In the manufacture of that known pad of bags it is difficult to weld and pierce through the entire height of the pad. Whereas the individual bags can be torn off neatly from the pad along their perforation lines, additional process steps are required when the bags provided with perforation lines have been made. This is inconsistent with the requirement of economical industrial manufacture.

It is an object of the invention to provide a process and apparatus for a continuous and automatic manufacture of pads which have a pleasant appearance and can be made in step with the manufacture of the bags themselves.

In a process of the kind described first hereinbefore, this object is accomplished according to the invention in that a plastics material tubing is advanced in steps corresponding to the length of the pad toward a welding and severing station, in which a bottom seam is formed, the leading tubing section is severed in the bottom seam weld or behind the bottom seam weld, in the direction of travel of the tubing, the bag which has been severed from the tubing is stacked and is perforated at its end to be formed with an opening, that strip of the tubing which is disposed between the perforation line and the severed edge is tack-welded to the underlying strip, these operations are repeated to form a pad which consists of bags in the desired number or which has the desired height, and the resulting pad is then carried away. In the process according to the invention, pads of bags can be made in step with the manufacture of the bags so that an additional processing station is required but there is no need for steps which would interrupt the cyclic automatic manufacture of bags because the pad is formed in the packaging station which is anyway required. The process according to the invention has the further advantage that the bags are indivudually pierced, perforated, and tack-welded to the pad as the same is building up. For this reason, the elastic bag material can be pierced and perforated neatly whereas piercing and perforating throughout the height of the pad would be difficult. Because each pad is tack-welded along its tear-off strip to the pad which is building up, the welding times and the welding temperature may be reduced since the welding heat must penetrate only two plies of sheeting rather than the entire thickness of the pad. In addition to involving a simplified and more economical manufacture of the pad of bags, the process according to the invention thus results in pads of bags which have a pleasing, sales-promoting appearance because the top edge portion of the pad is not marred by seam welds by which all bags of the pad are fused together and by pierced holes or bores subsequently formed in said edge portion.

An apparatus which may be used, e.g., to carry out the process consists according to the invention of a transverse welding and severing station, which extends over the width of and is operated in step with the intermittently advanced tubing, at least one piercing sleeve which in the direction of advance, i.e., the downstream direction of the tubing succeeds the transverse welding and severing station, perforating tools which succeed, i.e., are downstream of, said piercing sleeve and extend transversely to the tubing over the width thereof and are intermittently operated in cooperation with backing tools, a transverse welding bar, which is disposed between the severing station and the perforating tools and cyclically operated to join the respective last tubing section to the last but one tubing section, and a support, which is adapted to be raised or lowered in accordance with the increasing height of the pad and supports the latter at least adjacent to the piercing sleeve and the perforating tools and which pushes the pad of bags from the piercing sleeve and the perforating tools when the pad has the desired height. The apparatus according to the invention advantageously combines a packaging station and a pad-forming station and does not comprise means which would interrupt the cyclic formation of bags. In step with the formation of bags, the last bag made at a time is joined to the pad to be built up.

When the welding bar which tack-welds the bags to the growing pad returns, that bar should not loosen or seperate the bags at the rear end of the pad. For this purpose, the support is provided at its rear end with spikes for retaining the deposited tubing sections on the support.

According to a simple and desirable feature of the invention, a rubber pad may be used as a backing tool for cooperation with the piercing sleeves and the perforating tools. According to a further feature of the invention, the piercing sleeves and the perforating tools are disposed below the plane of travel of the tubing and the backing tools and the transverse welding bar are disposed above said plane so that the tubing is tack-welded along its tear-off strip to the growing pad as the tubing is forced against the backing tools.

The piercing sleeve is suitably provided with a serrated annular cutting edge so that the hole for suspending the pad can be neatly formed in the tubing without need for a substantial cutting pressure.

The piercing sleeves and the perforating tools are preferably stationary in the machine whereas the backing tool is movable. As a result, the pad is retained on the tools until the pad has been built up to the desired height and is then ejected. The piercing sleeves and the perforating tools may be mounted on a tool holder.

The support for the tubing sections forming the pad of bags suitably constitutes a stripper having a separate drive. When a pad consisting of bags in the predetermined number has been formed, the stripper may be operated in response to a pulse delivered by a counter and when the backing tool is in its disengaged position. For this reason, the cyclic manufacture of bags and formation of pads need not be interrupted even when a complete pad of bags is carried away.

Figure 3:
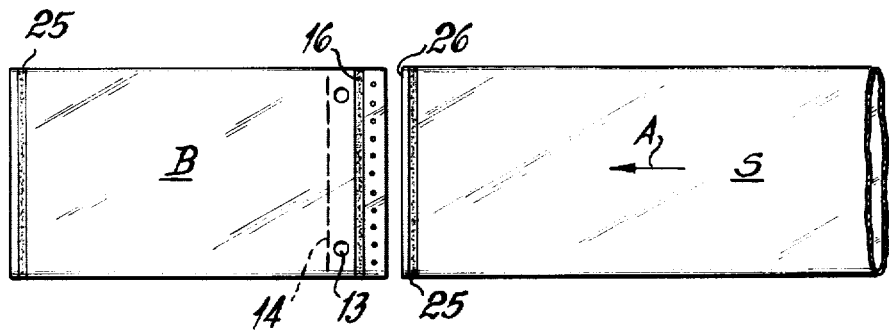
Figure 2:
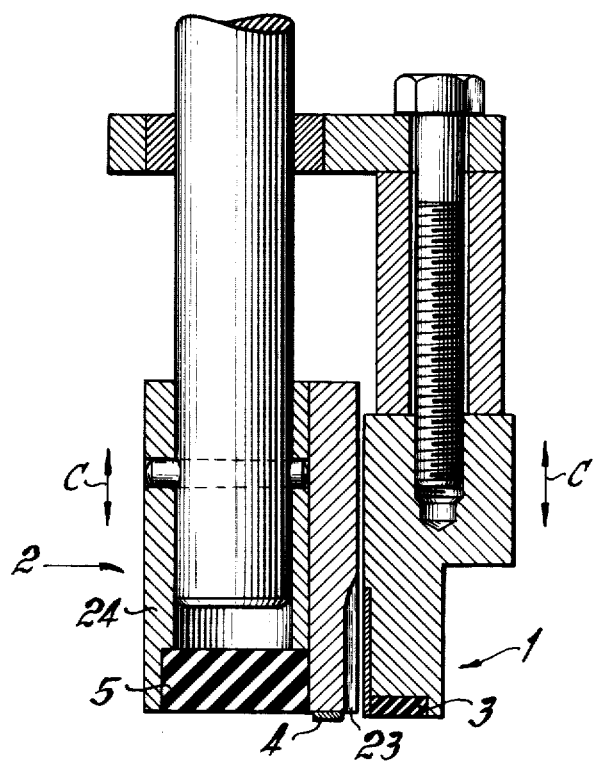
Figure 2:
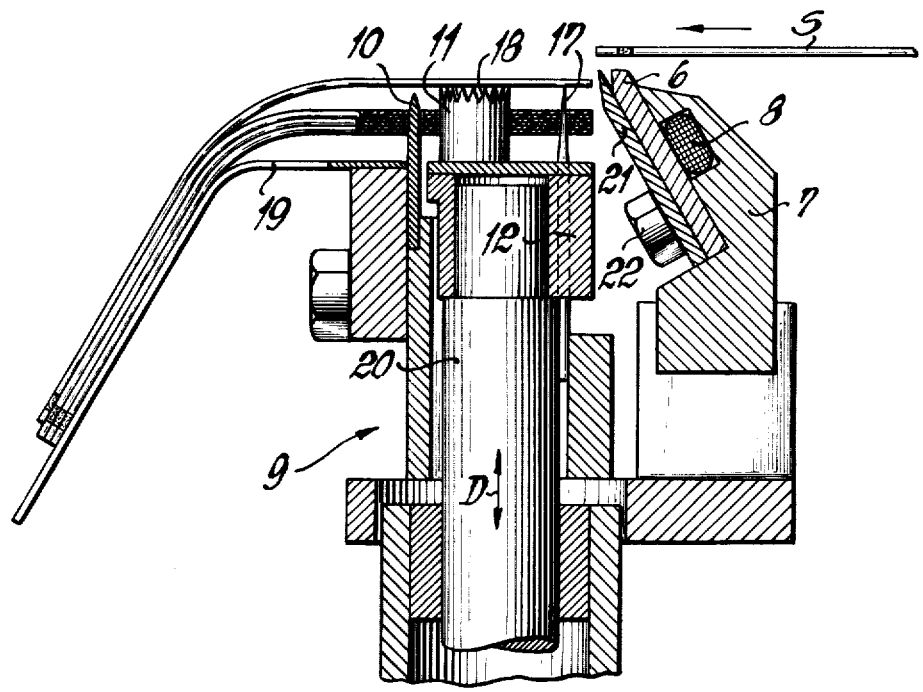

An embodiment of the invention will now be explained more fully with reference to the accompanying drawings, in which FIG. 1 is a perspective view showing diagrammatically a pad-forming station, FIG. 2 is a vertical sectional view taken on a plane which is parallel to the center line of the tubing and showing the apparatus of FIG. 1, and FIG. 3 is a top plan view showing the pad of bags and the tubing when the severing and welding step has been completed.

The bag- and pad-forming station shown in FIG. 1 consists of a toolholder 9, which is stationary with respect to the machine and carries perforating tools 10 in a row which extends at right angles to the center line of a tubing S and across the width of the latter, and piercing sleeves 11 and retaining spikes 17 in parallel rows, which are spaced from the perforating tools in the direction opposite to the direction of travel of the tubing.

A welding jaw 6 and a severing knife 21 are also disposed under the plane of travel of the tubing S and secured with screws 22 to the holder 7, which is stationary in the machine. The severing knife 21 extends across the tubing, and its cutting edge is disposed slightly above the welding jaw, which is parallel to said edge. The welding jaw 6 is in heat-conducting connection to the heating resistor 8, which is disposed in a groove of the holder 7. To prevent a heating of the piercing sleeves 11 and the perforating tools 10, there is no direct heat-conducting connection between the tool holder 9 and holder 7.

The backing tool 2 and the backing jaw 1 for cooperation with the welding bar 6 are disposed above the plane of travel of the tubing and are adapted to be raised and lowered in the direction of the double arrows C.

The backing tool 2 consists of a rubber bar 5, which is embedded in a holder 24. The piercing sleeve 11 and the perforating tools 10 can be forced into the rubber strip 5 when the same is lowered. The spikes 17 can extend into a gap 23, which is left between the holder 24 and the backing welding jaw 1. A welding bar 4 is provided on the rear side of the holder 24 between the row of spikes 17 and the piercing sleeves 11.

A strip 3 of silicone rubber is disposed in a groove of the backing welding jaw 1.

The piercing sleeves 11 and the spikes 17 extend through a supporting plate 12, which is mounted on columns 20 and adapted to be raised and lowered.

A curved plate 19 is secured to the forward side of the tool holder 9 and forms a chute for the complete pads of bags.

The apparatus operates as follows: By feed rolls, not shown, the tubing S is intermittently withdrawn from a supply roll in steps corresponding to the length of the pad of bags and is supplied to the bag- and pad-forming station. When the tubing has stopped, the backing welding jaw 1 and the backing tool are lowered onto the tubing simultaneously or one slightly after the other. In response to the lowering of the backing welding jaw, the bag bottom seam 25 and the severed edge 26 are formed, and in response to the lowering of the backing tool 2 the tubing section is pushed onto the perforating tools 10, the piercing sleeves 11 and the row of spikes 17 and the pad-forming tack-welded seam 16 is formed. The intermittent advance of the tubing S and the lowering of the backing welding jaw 1 and the backing tool 2 performed after each step of advance of the tubing are repeated until a pad consisting of bags in the desired number has been formed. The operation of the means for driving the support 12 is then initiated by hand or by a counter, not shown, so that the support pushes the edge of the pad of bags from the perforating tools 10, the piercing sleeves 11 and the retaining spikes 17. The pad B which has thus been pushed off leaves the pad-forming station via the cute 19 and is carried away by succeeding conveyors, which are not shown.

FIG. 3 is a top plan view showing a pad of bags and the intermittently advanced tubing S. A suitable holder may be inserted into the holes 13 of the pad of bags so that the pad is ready for use. Each bags can then be torn off along its perforation line 14 as required.

What is claimed is:

1. Apparatus for manufacturing pads of bags made of synthetic thermoplastics, comprising a welding means and a severing means which extends over the width of the thermoplastic tubing being formed into bags and operate in step with the intermittent advance of the thermoplastic tubing through the apparatus, piercing means positioned downstream of said severing means, perforating means positioned downstream of said piercing means, and tools extending transversely to the tubing over the width thereof, said welding means comprising a welding bar, which bar is transversely disposed with respect to said tubing between said severing means and said perforating means so as to cooperate with said severing and perforating means to join the last formed bag to the preceeding formed bag, and a vertically moveable support, which support is adapted to be raised or lowered in accordance with the increasing height of the pad of bags, said support positioned so as to support bags approximately adjacent said piercing and perforating means, said support being adapted to push the pad of bags from the piercing and the perforating means when said pad has a desired height.

2. Apparatus according to claim 1, including a stripper and a drive therefor, said stripper being mounted on said support.

3. Apparatus according to claim 1, characterized in that the support is provided at its rear end with spikes for retaining the deposited tubing sections on the support.

4. Apparatus according to claim 1 wherein the piercing and perforating means include at least one piercing sleeve and a series of perforating tools disposed below the plane of travel of the tubing and a backing means disposed above said plane.

5. Apparatus according to claim 4, further including a rubber pad, said rubber pad forming a part of the backing which engages said piercing sleeve and perforating tools.

6. Apparatus according to claim 4, further including a serrated annular cutting edge on said piercing sleeve.

7. Apparatus according to claim 4 wherein said piercing sleeve and perforating tools are stationary in the apparatus and said backing means is movable.

8. Apparatus according to claim 4 further including a tool holder for mounting thereon said piercing sleeve and perforating tool.

* * * * *